June 6, 1950  F. H. MUELLER  2,510,512
SUPPORT FOR METERS AND THE LIKE
Filed Dec. 30, 1947  2 Sheets-Sheet 1
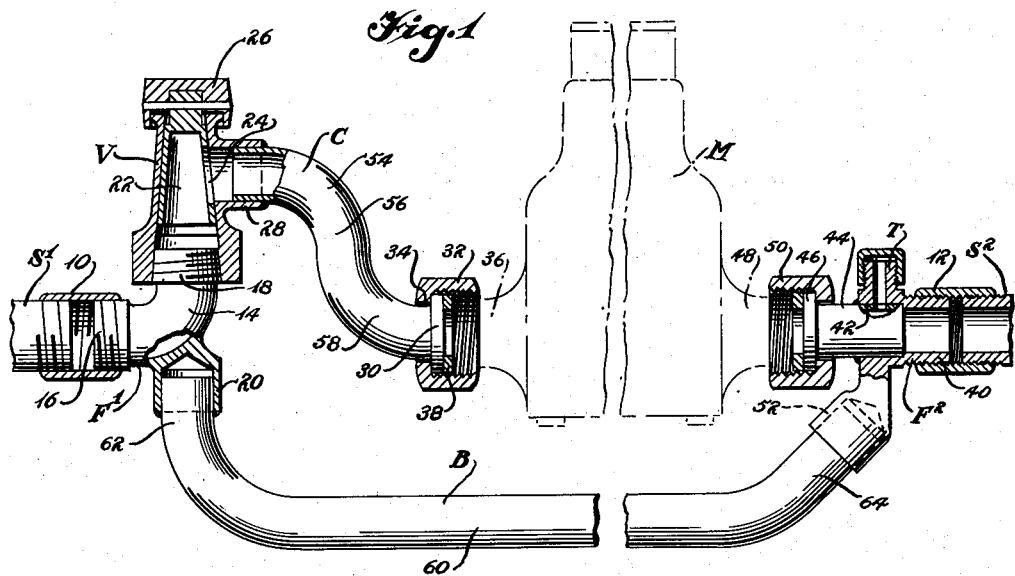
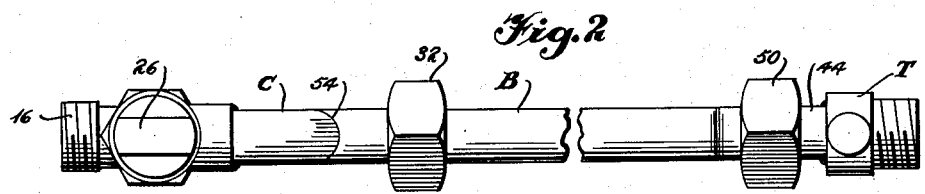
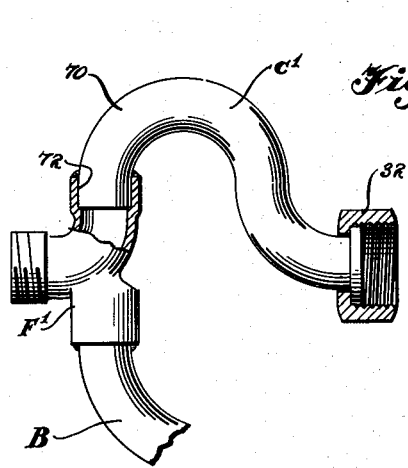
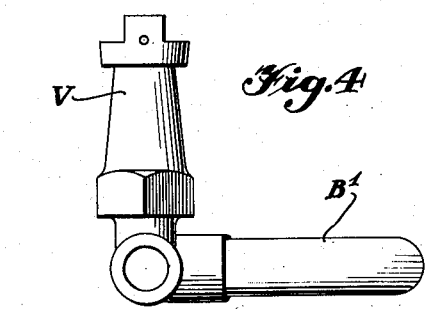
INVENTOR.
Frank H. Mueller
BY
Cushman, Darby & Cushman
ATTORNEYS June 6, 1950 F. H. MUELLER 2,510,512
SUPPORT FOR METERS AND THE LIKE
Filed Dec. 30, 1947 2 Sheets-Sheet 2
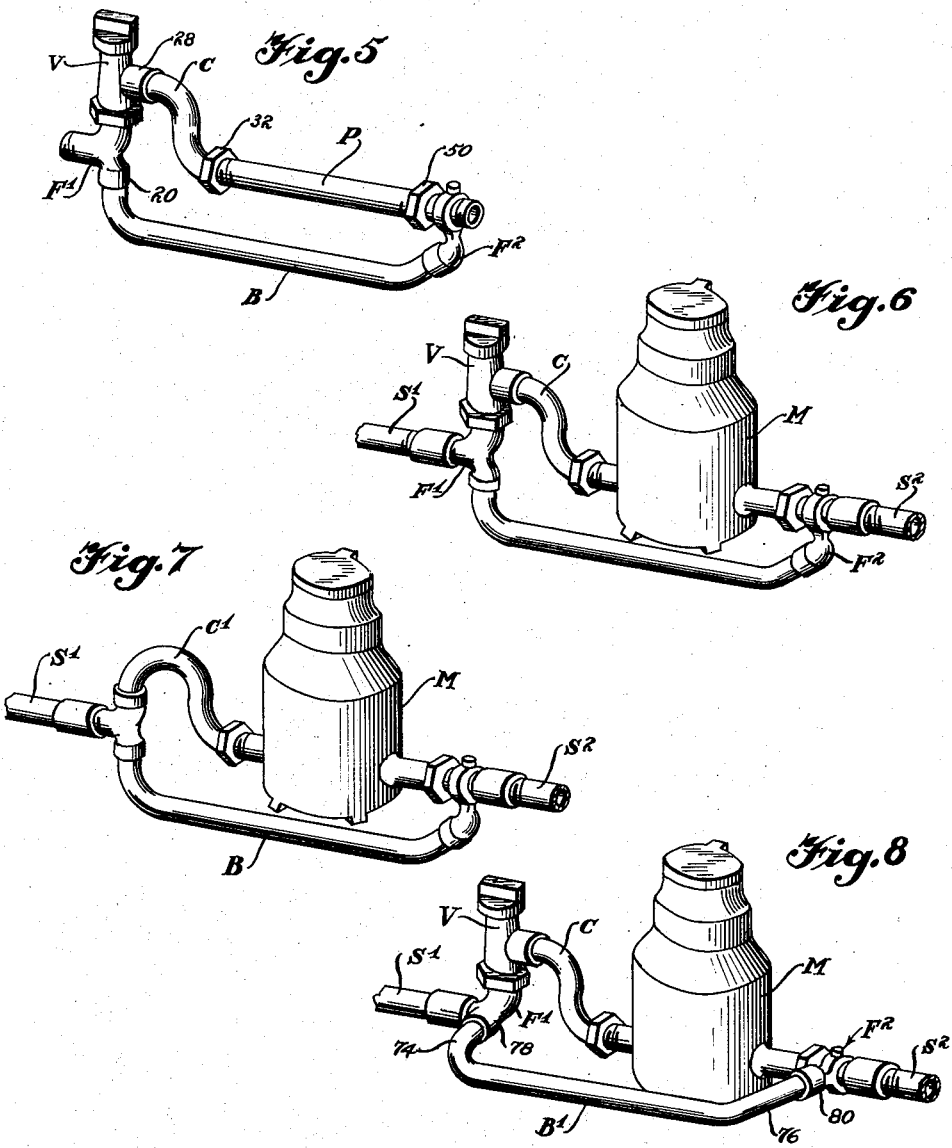
INVENTOR.
Frank H. Mueller
BY
Cushman, Darby & Cushman
ATTORNEYS Patented June 6, 1950

2,510,512

UNITED STATES PATENT OFFICE 2,510,512

SUPPORT FOR METERS AND THE LIKE

Frank H. Mueller, Decatur, Ill.

Application December 30, 1947, Serial No. 794,521

1 Claim. (Cl. 285—3)

The present invention relates to supports for meters and the like, and the principal object of the invention is to provide an arrangement of parts which can be fabricated and accurately assembled with facility and at minimum cost. As the description herein progresses, it will be observed that the elements forming the assembly are of simple nature, yet the resulting product is rugged and accurately aligned, in support of the meter, whereby the rupturing of joints and the resulting leakage of fluid from the line in which the meter is installed, as commonly encountered in the art, are avoided.

A principal object of the invention is to provide an assembly of equipment of the character referred to above, which permits installation of the meter in line with the supply and service mains in which it is connected. It is also an object of the invention to provide for the mounting of a meter in the manner referred to so that the connections thereto are free of strain. It is also an object of the invention to provide a relatively compact installation of the meter, whereby less head room above the meter is required, to facilitate its convenient installation in confined places. Certain variations of the equipment provide for similar advantages in reducing the room required beneath the meter, when installed.

Another important object of the invention is to provide equipment of the type mentioned which includes in its assembly, the conventional vertically placed angle stop or valve, rather than requiring separate installation of this valve in the supply line as in certain prior art assemblies which sought the advantages of the present invention.

In the drawings which illustrate several forms which the assembly may take:

Figure 1 is a side elevational view of the assembly of equipment, partly in section, diagrammatically illustrating the in line mounting of a meter or the like in the assembly.

Figure 2 is a top plan view of the equipment shown in Figure 1.

Figure 3 is a side elevational view of a modified arrangement of the equipment, wherein the angle stop or valve is omitted.

Figure 4 is an end view, looking from the direction of the supply of the fluid, showing a modified arrangement in which the supporting rod, pipe or bar is displaced laterally, rather than downwardly as in Figure 1.

Figures 5 and 6 are diagrammatical views illustrating the steps in arranging the equipment of Figure 1 for the mounting of the meter.

Figure 7 is a diagrammatical view illustrating the mounting of the meter with the modified arrangement of Figure 3, wherein the angle stop or valve is omitted, and Figure 8 is a diagrammatical view illustrating the mounting of the meter with the modified equipment of the type shown in Figure 4, with the laterally displaced supporting bar.

Referring to Figure 1, the supply main leading from the source of fluid is shown at $S_1$ and the service main, leading for instance into a house, is shown at $S_2$. As is well-known in the art, a fluid main is usually broken and a section omitted therefrom in order to install a meter in the line. In some instances, the supply and service mains are connected to and from a meter box, within which the meter is mounted, and in other instances, expensive and specially cast yokes are provided to support the meter in the line, the present invention dealing with an assembly of parts which does not require the use of the more expensive equipment just referred to, yet providing advantages not present in the use of these more expensive equipments.

The ends of the supply and service mains are provided with conventional iron pipe threads, and they are respectively connected with supply and service fittings $F_1$ and $F_2$ by means of ordinary iron pipe couplings 10 and 12, respectively, although other standard couplings might be employed. The meter M is mounted between the fittings $F_1$ and $F_2$ in a manner hereinafter described, and rigidity and strength are provided for the structure by the supporting bar B which for purposes of economy and convenience may take the form of a galvanized pipe appropriately bent and adjusted and then soldered between the fittings $F_1$ and $F_2$ to provide the foundation on which the meter is carried.

It will be observed that the fittings $F_1$ and $F_2$ while not conventional in form, are of such simple design that they may be easily cast from such material as brass. The fitting $F_1$ comprises a hollow right angle elbow having a threaded connecting end 16 for attachment to the coupling 10, and a threaded connecting end 18 to which is secured the angle stop or valve V, thus providing a fluid way through the fitting from the supply main to the valve. The fitting $F_1$ is also provided with a socket 20, which generally lies in the same plane as the connecting ends 16 and 18, directed downwardly, or in a direction opposite to that of the connection 18, and at right angles to the direction of the connection 16. The socket 20 is of such length as to provide for the adjustable mounting of the end of the bar B therein, as hereinafter described.

The valve V is of conventional design, being hollow and having therein a hollow valve member 22 cut away at one side to provide a port 24, the valve member having a suitable head which can be turned by the wrench hold member 26 rigidly attached thereto.

Extending in a horizontal direction from the body of the valve V toward the meter and generally in the same plane as the connecting ends 16 and 18 is a socket member 28. This socket is of such size as to be capable of adjustably receiving one end of a bent connecting conduit C, which may be made of such flexible material as copper.

The forward end of the conduit C is flanged outwardly as at 30 and a connecting nut 32 equipped with a cooperating internal flange 34 is provided to thread and rigidly secure the end of the conduit to one of the aligned nipples of the meter, said nipple being only diagrammatically indicated but designated by the numeral 36. A conventional gasket 38 may be provided within the nut 32 to seal between the flange 30 and the end of the meter nipple.

The fitting F₂ is also of simple design having an outer connecting end 40 for securing same to the coupling 12, and it is provided with an inner chamber 42 to adjustably receive the end of a hollow separate coupling member 44, the latter having a flange 46 at its inner end whereby it may be coupled to the opposite nipple 48 of the meter by a nut 50 in a manner similar to that described for the connection to the opposite meter nipple. If desired, the coupling 44 may be provided with a suitable port as shown in alignment with the port through a test valve projection T on the fitting F₂, such a test valve being of construction in purpose well-known in the art.

The fitting F₂ is further equipped with a socket 52 generally lying in the plane of its connecting end 40 but being angularly directed inwardly and downwardly as shown, the socket being of such size as to provide for the securing in adjusted positions of the opposite end of the supporting bar B. It will be obvious from the above that the supporting assembly described may be erected from parts which may be manufactured at minimum expense. It will further be noted that the arrangement of the parts, including the bending of the conduit C provides for the mounting of the meter M with its nipples in line with respect to the connecting ends 16 and 40 of the respective fittings F₁ and F₂ and in line with the ends of the supply and service mains S₁ and S₂. When I use the phrase "in line" mounting of the meter, I refer to its position with respect to the connecting ends of the supply and service mains, rather than any outer portions thereof which may be displaced in direction in accordance with the particular installation. The conduit C is bent through a substantially right angle as at 54 between its outer end and its central portion 56 and is bent through a substantially reverse right angle as at 58 between its inner end and said central portion. The form and arrangement of the conduit C, as hereinafter described, not only provides for the convenient mounting in the assembly of the vertical angle stop or valve V, but also provides for the proper horizontal adjustment of the connecting nut 32 with respect to the meter nipple 36, having in mind that the purpose of the invention is to prefabricate a rigid assembly which will accurately connect with a meter having its attaching fittings spaced a given distance apart.

The bar B comprises a central horizontal section 60 and an end portion 62 bent upwardly at substantially right angles therefrom, the end 62 in its association with the socket 20 providing for proper vertical adjustment of the fitting F₁ with respect to the fitting F₂. The opposite end of the bar B is bent upwardly as at 64, to a degree less than a right angle and it is arranged for adjustment in the socket 52 in such manner as to vary the horizontal distance between the fittings F₁ and F₂. The degree of bending of the ends of the bar B is such as to displace this bar from alignment with the ends of the supply and service mains to an extent sufficient to permit the installation of the meter in line with the ends of the supply and service mains. The combination of equipment as described above is assembled in the manner illustrated in Figures 5 and 6 having in mind the dimensions of the meter, and particularly the design and distance between its connecting nipples. The coupling 44 is inserted into the chamber 42 of the coupling F₂ and soldered therein at proper position and thereafter the end 64 of the bar B is inserted into the socket 52 and rigidly soldered in proper position therein.

The angle stop or valve V is then threaded onto the upper connecting end 18 of the fitting F₁, and the free outer end of the conduit C is loosely inserted into the socket 28. The vertical end 62 of the bar B is thereafter loosely inserted into the socket 20, and a spacer pipe P is then rigidly coupled between the nuts 32 and 50 respectively on the inner end of the conduit C and the coupling member 44 which forms a part of the fitting F₂. The spacer pipe P is of length equal to the distance between the outer ends of the meter nipples 36 and 48 and is equipped with connecting threads at its ends identical with the threads of said nipple. As the joints provided by sockets 20 and 28 are loose, the flange 30 on the inner end of the conduit C or its nut 32 may thus be angularly adjusted as to alignment and distance from the flange 46 and coupling nut 50 on the fitting F₂, the outer end of the conduit C and the end 62 of the bar B being inserted into their respective sockets 28 and 20 to a degree necessary to secure this proper alignment and spacing, with the space pipe P rigidly connecting the couplings 32 and 46. The joints at the sockets 28 and 20 may be soldered, thus completing the fabrication of the yoke.

If it is desired to omit the angle stop V, a connecting copper conduit C₁ of modified design may be employed, as disclosed in Figure 3. In addition to the inner bend of this conduit toward the end which carries the coupling 32, this conduit is reversely bent through substantially 180° as at 70 whereby it can be soldered within a socket 72 on the connecting end of the fitting F₁, it being understood that this interior socket will be of such size and length as to permit adjustment of the end of the conduit therein, whereby proper vertical adjustment and alignment of the coupling end 32 of the conduit C₁ is assured. The fabrication and assembly of the combination used with the conduit C₁ is substantially similar to that described in connection with the principal embodiment of the invention, and the assembly is illustrated in Figure 7 of the drawings.

In order to provide an assembly whereby installations may be made at locations where there is no available space beneath the supply and service mains, a supporting bar B₁ of the type shown in Figure 8 may be employed, extending laterally with respect to the mains S₁ and S₂ but in the same horizontal plane, the end bends 74 and 76 in said bar being of the same degree as the corresponding bends 62 and 64 (Figure 1) but in a horizontal rather than in a vertical plane. In this modification, sockets 78 and 80, similar in design and arrangement to the respective sockets 20 and 52 (Figure 1) are provided on the fittings F1 and F2, except that these sockets extend outwardly in a horizontal plane, or at right angles with respect to the vertical connecting end 18 from fitting F1 (Figure 1) whereby no room below the meter is occupied by the assembly. In this modification, it will be noted that the assembly provides for the in line mounting of the meter M and also the presence in the assembly of the angle stop or valve V. The assembly and adjustment of the equipment of Figure 8 will be substantially similar to that described in connection with Figure 1 and will be obvious from that description.

It will be obvious that variations of the equipment described above will suggest themselves. It will be understood that the use of words describing relative positions of the parts herein are not intended to limit the equipment to any precise manner of installation, but are only intended to facilitate the description of the parts shown in the drawings. The angle stop or valve may be omitted when not required, although the invention conveniently provides for its presence in the assembly without yielding other advantages, and when the angle stop is present, it may be considered as a part of the conduit C or the fitting F1. The invention provides for a rigid connection between the ends of the supply and service mains which generally have no other means to insure their rigid alignment with one another, and provides a sturdy and durable support for the meter without undesirable strains on the necessary couplings. It will be particularly observed that the arrangement is such that the copper connecting conduits C and C1 are not placed under strain by the suspension of the meter as in other prior art installations.

From the above description, it is apparent that fitting F1 may be adjusted with respect to fitting F2 with the spacer pipe connected, before rigidly soldering the assembly at the sockets of the fitting F1. Obviously, other types of bonding may be used in place of soldering, such as welding.

It will be noted that sockets 20 and 52, and 78 and 80, respectively, have axes lying in the same plane but displaced from parallel relation with respect to one another to a degree permitting both longitudinal and vertical or lateral adjustment of the fitting F1 with respect to fitting F2 before the ends of the bar B are soldered.

In erecting the assembly disclosed herein, one socket or joint capable of providing horizontal adjustment and one such socket or joint capable of providing vertical adjustment should be left unsoldered until after the spacer bar or pipe is rigidly connected between the opposed inner attaching means.

I claim:

Apparatus for setting meters and the like which have opposite aligned inlet and outlet nipples, comprising separately fabricated supply and service fittings each having outer attaching means for the aligned ends of supply and service mains, one of said fittings being adapted for removably securing said fitting to the nipple on one side of the meter, the other of said fittings having an inner attaching means formed with its axis out of alignment with the axis of its outer attaching means and constituting a socket, a separately fabricated bent conduit forming an adjustable fluid connection between said socket and the nipple on the other side of the meter, each of said fittings having a socket with its axis displaced from the axis of its outer attaching means, and a separately fabricated supporting pipe section having opposite ends bonded in said last-named sockets and formed for adjustment therein prior to bonding to properly align and space said fittings with respect to one another.

FRANK H. MUELLER.

REFERENCES CITED

The following references are of record in the file of this patent:

UNITED STATES PATENTS

| Number | Name | Date |
| --- | --- | --- |
| 1,696,757 | Ford | Dec. 25, 1928 |
| 1,847,606 | Ford | Mar. 1, 1932 |
| 2,125,380 | Krueger | Aug. 2, 1938 |
| 2,438,497 | Ford | Mar. 30, 1948 |